(12) United States Patent
Okuma et al.

(10) Patent No.: US 10,260,987 B2
(45) Date of Patent: *Apr. 16, 2019

(54) COLLIMATION EVALUATION DEVICE AND COLLIMATION EVALUATION METHOD

(71) Applicant: HAMAMATSU PHOTONICS K.K., Hamamatsu-shi, Shizuoka (JP)

(72) Inventors: Junji Okuma, Hamamatsu (JP); Yasunori Igasaki, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/329,377

(22) PCT Filed: Jul. 29, 2015

(86) PCT No.: PCT/JP2015/071528
§ 371 (c)(1),
(2) Date: Jan. 26, 2017

(87) PCT Pub. No.: WO2016/017706
PCT Pub. Date: Feb. 4, 2016

(65) Prior Publication Data
US 2017/0219458 A1      Aug. 3, 2017

(30) Foreign Application Priority Data

Jul. 30, 2014   (JP) .................. 2014-154779

(51) Int. Cl.
*G01J 9/02*     (2006.01)
*G01M 11/00*    (2006.01)
(52) U.S. Cl.
CPC ............ *G01M 11/00* (2013.01); *G01J 9/02* (2013.01); *G01J 9/0215* (2013.01)

(58) Field of Classification Search
CPC ............ G01J 9/0215; G01J 2009/0234; G01J 2009/0223; G01B 9/02098; G01B 9/02032
See application file for complete search history.

(56) References Cited

U.S. PATENT DOCUMENTS 5,270,792 A * 12/1993 Snyder .................. G01J 9/0215
                                                356/520
2004/0051877 A1   3/2004 Erwin
2015/0304616 A1* 10/2015 Tada .................... H04N 9/3191
                                                348/189

FOREIGN PATENT DOCUMENTS

CN      101113927 A    1/2008
CN      100547366      10/2009
(Continued)

OTHER PUBLICATIONS

Sriram, Kuppuswamy Venkatesan, et al. "Double-wedge-plate interferometer for collimation testing: new configurations." Applied optics 32.22 (1993): 4199-4203.*

(Continued)

*Primary Examiner* — Shawn Decenzo
(74) *Attorney, Agent, or Firm* — Drinker Biddle & Reath LLP

(57) ABSTRACT

A first reflection member, when light is incident, reflects a part of the light by a first reflection surface, reflects light transmitted through the first reflection surface by a second reflection surface, and emits reflected light components in an opposite direction. The second reflection member, when light emitted from the first reflection member is incident, reflects a part of the light by a first reflection surface, reflects light transmitted through the first reflection surface by a second reflection surface, and emits reflected light components. Interference fringes are formed on a screen by light reflected on the first reflection surface of the first reflection (Continued)

member and the second reflection surface of the second reflection member and light reflected on the second reflection surface of the first reflection member and the first reflection surface of the second reflection member.

12 Claims, 18 Drawing Sheets

(56) References Cited

FOREIGN PATENT DOCUMENTS

| JP | 2001-336914 A | 12/2001 |
|---|---|---|
| JP | 2002-277349 A | 9/2002 |
| JP | 4114847 B2 | 7/2008 |
| JP | 2009-103592 A | 5/2009 |

OTHER PUBLICATIONS

English-language translation of International Preliminary Report on Patentability (IPRP) dated Feb. 9, 2017 that issued in WO Patent Application No. PCT/JP2015/071528.

Kuppuswamy Venkatesan SRIRAM et al., "Double-Wedge-Plate Interferometer for Collimation Testing: New Configurations", Applied Optics, vol. 32, No, 22, Aug. 1, 1993, p. 4199-p. 4203, XP000383245.

Choi J. et al., "Wedge-Plate Shearing Interferometers for Collimation Testing: Use of a Moire Technique", Applied Optics, vol. 34, No. 19, Jul. 1, 1995, p. 3628-p. 3638, XP000S37284.

F Staub et al., "Collimation tester for ultrashort pulses and short coherence length lasers," Optik, Apr. 2006, pp. 193-195, vol. 117, No. 4.

K.V. Sriram et al., "Self-referencing collimation testing techniqures," Optical Engineering, Jan. 1993, pp. 94-100, vol. 32, No. 1.

De-Yan Xu et al., "Rotatable single wedge plate shearing interference technique for collimation testing," Optical Engineering, Apr. 1991, pp. 391-396, vol. 30, No. 4.

Li Gouhua et al., "Improved wedge-plate shearing interferometric technique for a collimation test," Applied Optics, Aug. 1, 1992, pp. 4363-4364, vol. 31, No. 22.

* cited by examiner

—Prior Art—

--Prior Art--

*Fig.5*
(a)
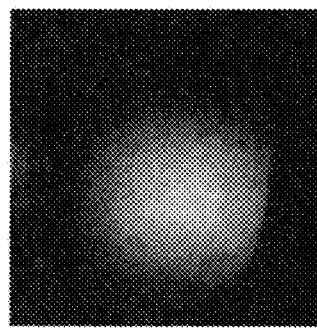
PLATE DISTANCE: 2.95mm
($\Delta L = -0.6$mm)
(b)
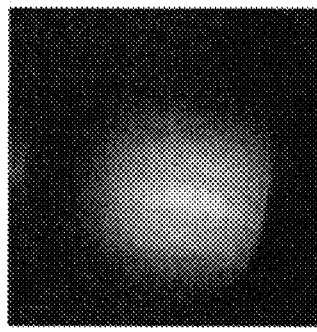
PLATE DISTANCE: 3.15mm
($\Delta L = -0.4$mm)
(c)
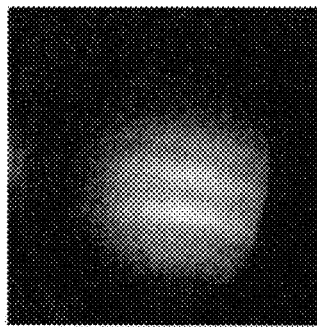
PLATE DISTANCE: 3.35mm
($\Delta L = -0.2$mm)

*Fig.6*
(a)
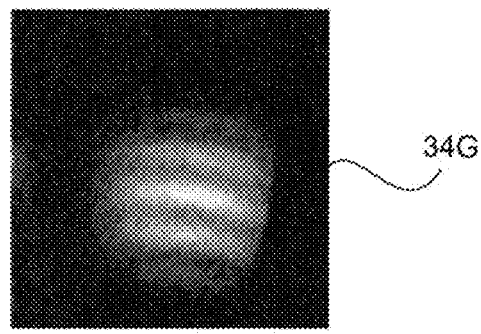
PLATE DISTANCE: 3.55mm
($\Delta L$=0mm)
(b)
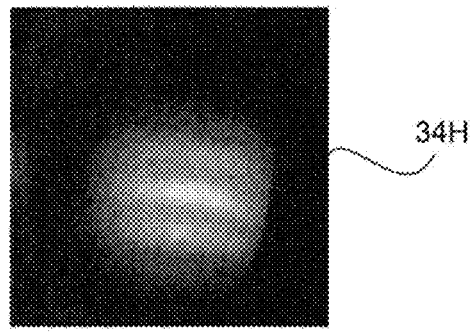
PLATE DISTANCE: 3.75mm
($\Delta L$=+0.2mm)
(c)
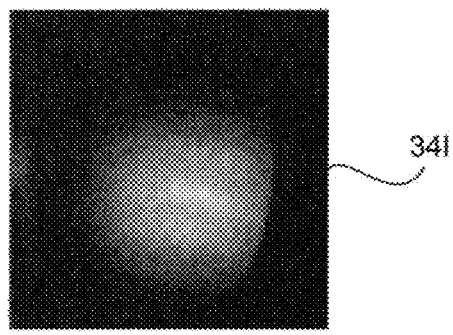
PLATE DISTANCE: 3.95mm
($\Delta L$=+0.4mm)

*Fig.9*
(a)
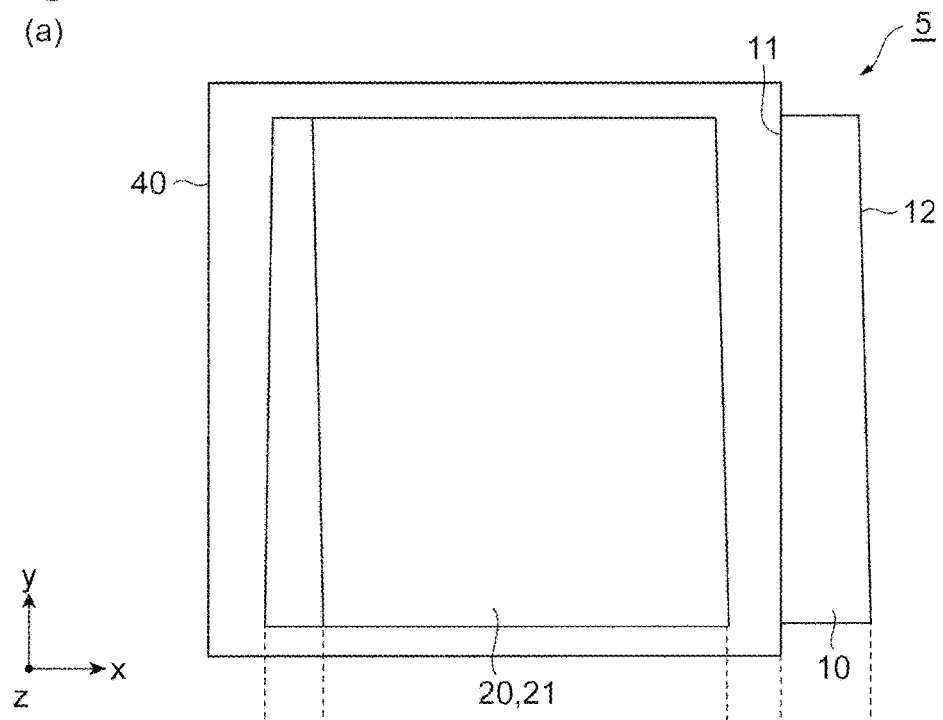
(b)
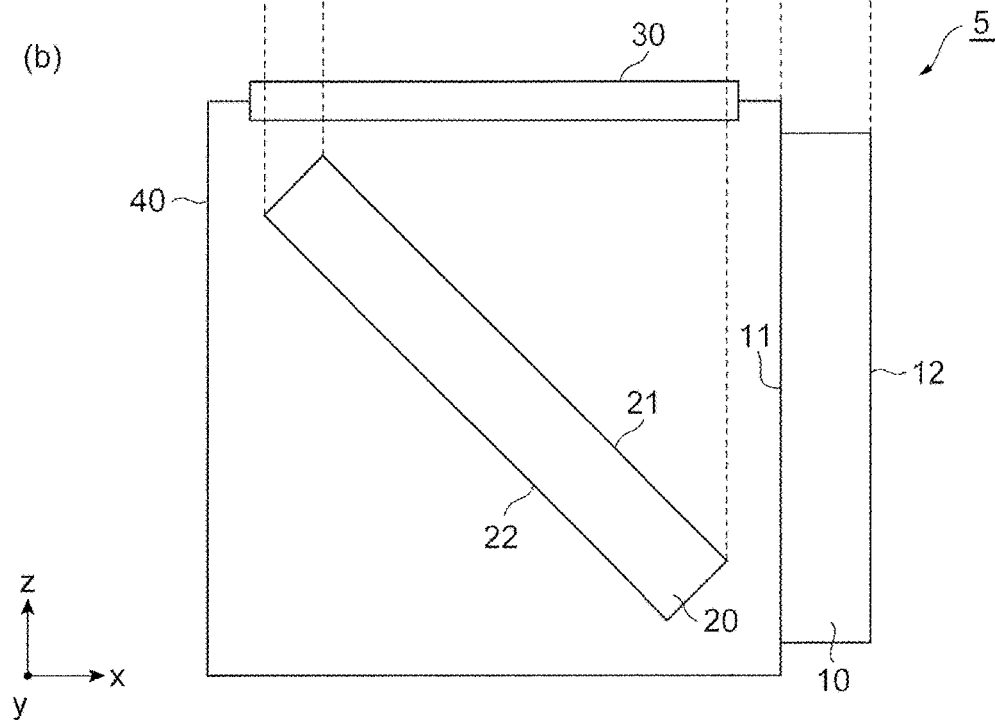

Fig.10
(a)
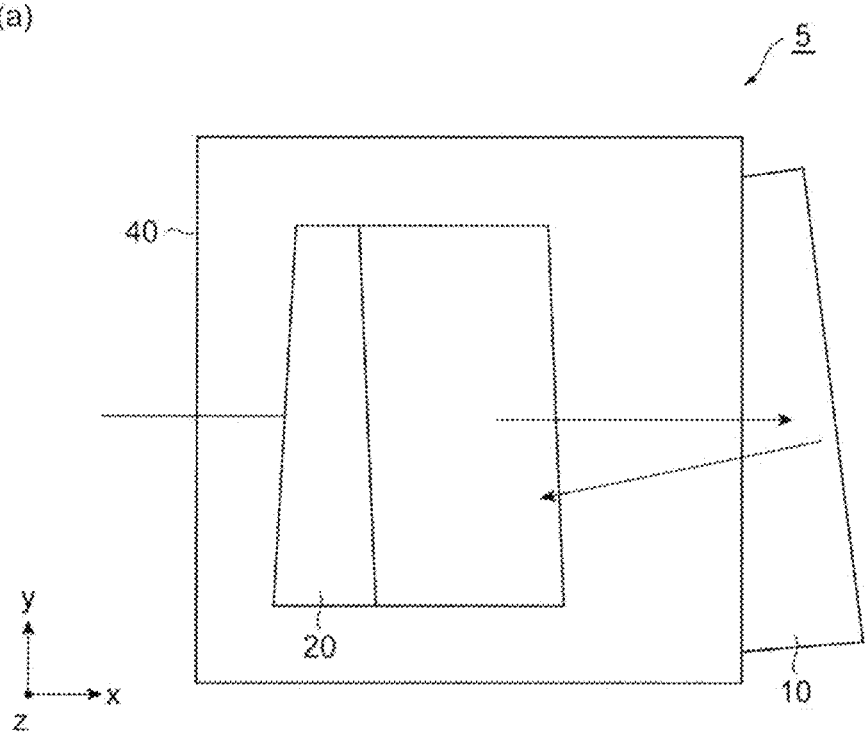
(b)
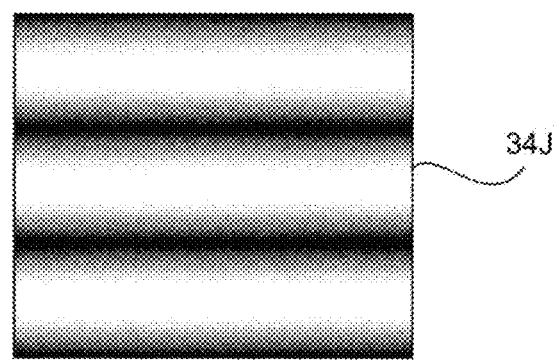

Fig.11
(a)
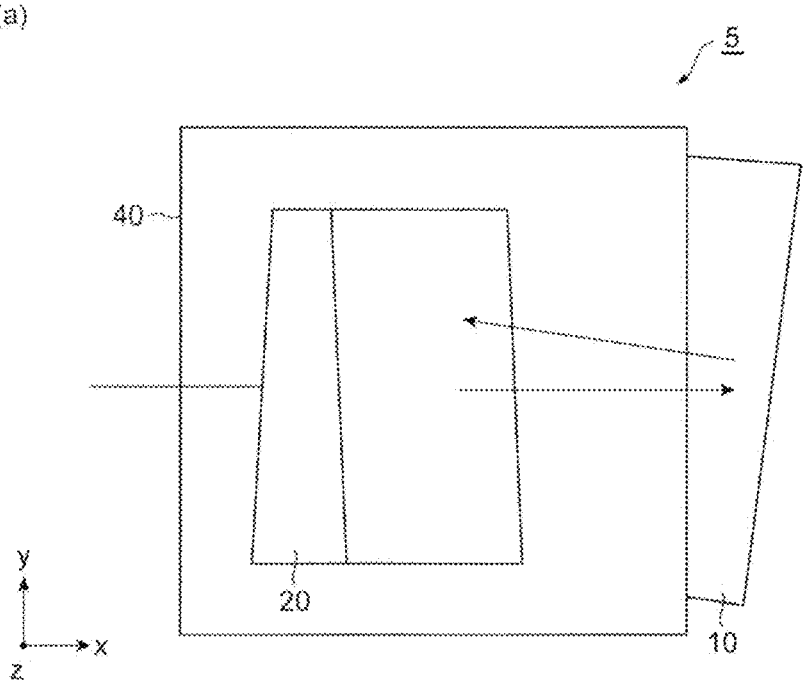
(b)
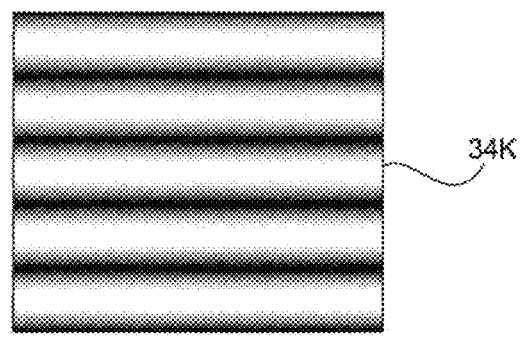

Fig.12
(a)
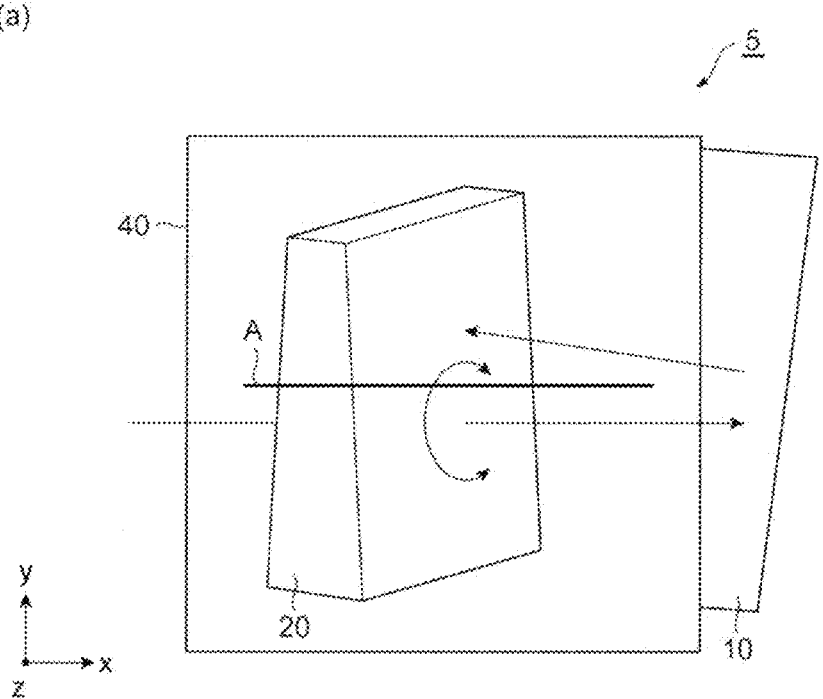
(b)
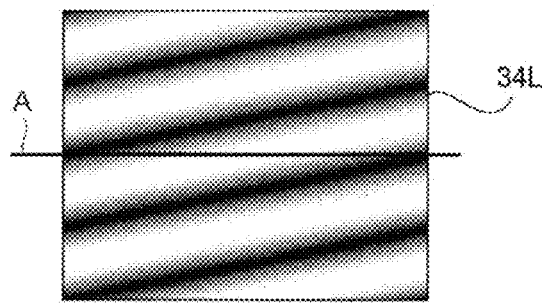

*Fig.13*
(a)
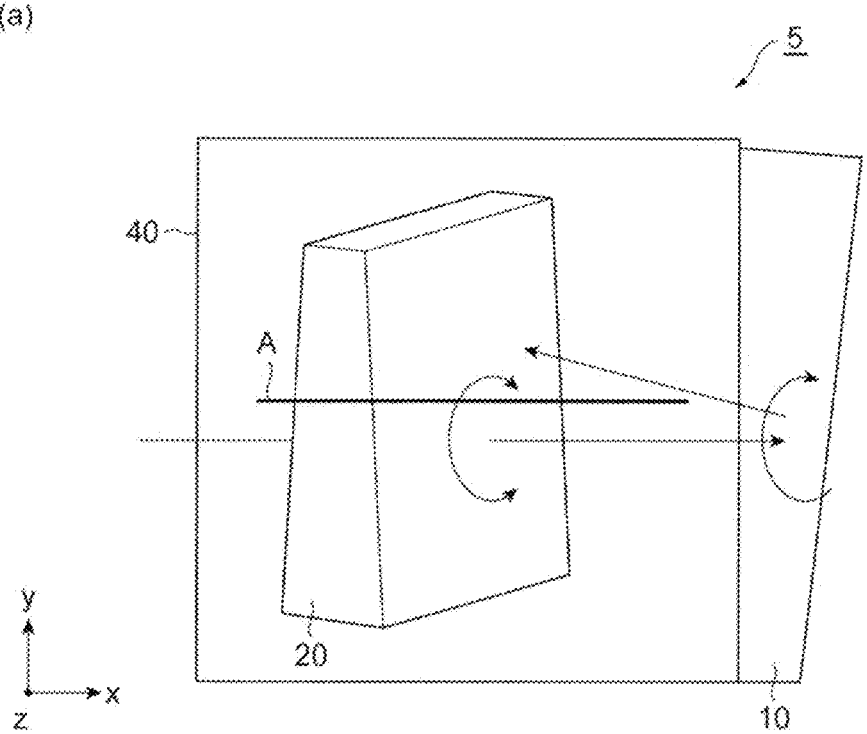
(b)
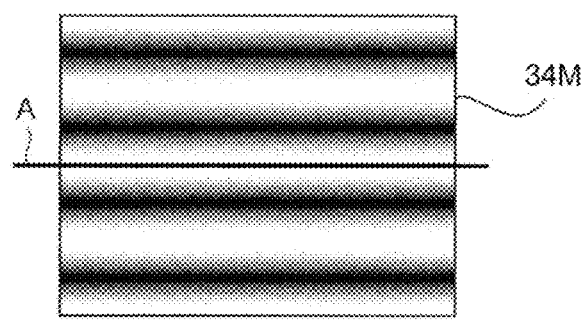

COLLIMATION EVALUATION DEVICE AND COLLIMATION EVALUATION METHOD

TECHNICAL FIELD

The present invention relates to a device and a method for evaluating collimation of light.

BACKGROUND ART

In various optical systems, the frequency of converting (collimating) diverging light emitted from a point light source (including a light source regarded as the point light source) into parallel light is high. As examples of the point light source, there are a laser diode and an optical fiber emission end. A distance between the point light source and a collimation optical system is appropriately set, so that the diverging light emitted from the point light source can be converted into the parallel light by the collimation optical system. Technologies for evaluating a degree of parallelization (degree of collimation) of the parallel light generated as described above are described in Patent Documents 1 and 2.

In particular, according to the technology described in Patent Document 1, collimation of light can be easily evaluated using a shear plate having a first reflection surface and a second reflection surface which are non-parallel to each other. That is, a collimation evaluation device using the shear plate causes light reflected on the first reflection surface of the shear plate and light transmitted through the first reflection surface of the shear plate and being reflected on the second reflection surface to interfere with each other on a screen, and can evaluate collimation of the light on the basis of a direction of interference fringes on the screen. The shear plate may be called a shearing plate.

CITATION LIST

Patent Literature

Patent Document 1: Japanese Patent Application Laid-Open Publication No. 2001-336914
Patent Document 2: Japanese Patent Publication No. 4114847

SUMMARY OF INVENTION

Technical Problem

In the collimation evaluation device using the shear plate described above, it is demanded to increase a thickness of the shear plate and decrease an angle (wedge angle) formed by the two reflection surfaces of the shear plate, for detecting a change in the direction of the interference fringes on the screen with high sensitivity. In particular, because the wedge angle affects the spacing of the interference fringes, the wedge angle is determined to some degree by the interference fringe spacing suitable for a collimation evaluation. Therefore, the thickness of the shear plate is increased for improving sensitivity.

An optical path difference is generated between light components until the light components are reflected on the two reflection surfaces of the shear plate and arrive at the screen. When the thickness of the shear plate increases, the optical path difference increases. Meanwhile, when the optical path difference is smaller than a coherence length of light of a collimation evaluation object, the interference fringes can be observed on the screen.

For example, CW laser light output from a HeNe laser light source has a coherence length of the order of 100 mm. Pulse laser light output from a solid-state laser light source with a pulse width of 40 ns has a coherence length of several mm. Further, pulse laser light output from an optical fiber laser light source with a pulse width of 40 ns has a coherence length of 1 mm or less. In general, laser light of a short pulse output from the solid-state laser light source or the optical fiber laser light source has a short coherence length due to a multi longitudinal mode or spectral broadening.

When the thickness of the shear plate is increased to improve the sensitivity, the optical path difference increases, and a collimation evaluation of light of which a coherence length is shorter than the optical path difference cannot be performed. As described above, conventionally, in the collimation evaluation device using the shear plate, it is difficult to evaluate collimation of light of which a coherence length is short with high sensitivity.

The present invention has been made to solve the above problem, and an object thereof is to provide a device and a method that can evaluate collimation of light of a collimation evaluation object with high sensitivity, even when a coherence length of the light is short.

Solution to Problem

A collimation evaluation device according to the present invention includes: (1) a first reflection member having a first reflection surface for reflecting a part of incident light and a second reflection surface for reflecting light transmitted through the first reflection surface in the incident light; and (2) a second reflection member having a first reflection surface for reflecting a part of light emitted from the first reflection member and a second reflection surface for reflecting light transmitted through the first reflection surface in the light, and (3) collimation of the incident light is evaluated on the basis of a direction of interference fringes formed by light reflected on the first reflection surface of the first reflection member and the second reflection surface of the second reflection member and light reflected on the second reflection surface of the first reflection member and the first reflection surface of the second reflection member.

A collimation evaluation method according to the present invention includes: (1) using a first reflection member having a first reflection surface for reflecting a part of incident light and a second reflection surface for reflecting light transmitted through the first reflection surface in the incident light, and (2) a second reflection member having a first reflection surface for reflecting a part of light emitted from the first reflection member and a second reflection surface for reflecting light transmitted through the first reflection surface in the light; (a) observing interference fringes formed by light reflected on the first reflection surface of the first reflection member and the second reflection surface of the second reflection member and light reflected on the second reflection surface of the first reflection member and the first reflection surface of the second reflection member; and (b) evaluating collimation of the incident light on the basis of a direction of the observed interference fringes.

In the collimation evaluation device or the collimation evaluation method described above, light of a collimation evaluation object is first incident on the first reflection member, a part of the light is reflected on the first reflection surface of the first reflection member, and light transmitted through the first reflection surface is reflected on the second reflection surface of the first reflection member. Light reflected on the first reflection member is then incident on the second reflection member, a part of the light is reflected on the first reflection surface of the second reflection member, and light transmitted through the first reflection surface is reflected on the second reflection surface of the second reflection member.

In these reflected light components, an optical path difference between light $L_{12}$ reflected on the first reflection surface of the first reflection member and the second reflection surface of the second reflection member and light $L_{21}$ reflected on the second reflection surface of the first reflection member and the first reflection surface of the second reflection member can be set to be smaller than a coherence length, and therefore, interference fringes caused by the two light components $L_{12}$ and $L_{21}$ can be observed. Collimation of the incident light can be evaluated on the basis of a direction of the observed interference fringes.

ADVANTAGEOUS EFFECTS OF INVENTION

According to the present invention, even when a coherence length of light of a collimation evaluation object is short, collimation of the light can be evaluated with high sensitivity.

BRIEF DESCRIPTION OF DRAWINGS

FIG. 5 includes (a)-(c) photographs of interference fringes observed on a screen 30 of the collimation evaluation device 2 according to the second embodiment.

FIG. 6 includes (a)-(c) photographs of interference fringes observed on the screen 30 of the collimation evaluation device 2 according to the second embodiment.

FIG. 9 includes (a), (b) diagrams illustrating a configuration of a collimation evaluation device 5 according to a fifth embodiment.

FIG. 10 includes (a), (b) diagrams illustrating an example of a function of the collimation evaluation device 5 according to the fifth embodiment.

FIG. 11 includes (a), (b) diagrams illustrating the example of the function of the collimation evaluation device 5 according to the fifth embodiment.

FIG. 12 includes (a), (b) diagrams illustrating another example of a function of the collimation evaluation device 5 according to the fifth embodiment.

FIG. 13 includes (a), (b) diagrams illustrating the other example of the function of the collimation evaluation device 5 according to the fifth embodiment.

DESCRIPTION OF EMBODIMENTS

Hereinafter, embodiments of the present invention will be described in detail with reference to the accompanying drawings. In the description of the drawings, the same elements will be denoted by the same reference signs, without redundant description. In addition, a xyz orthogonal coordinate system is illustrated in the individual drawings for the convenience of the description.

(Comparative Example)

Figure 1:
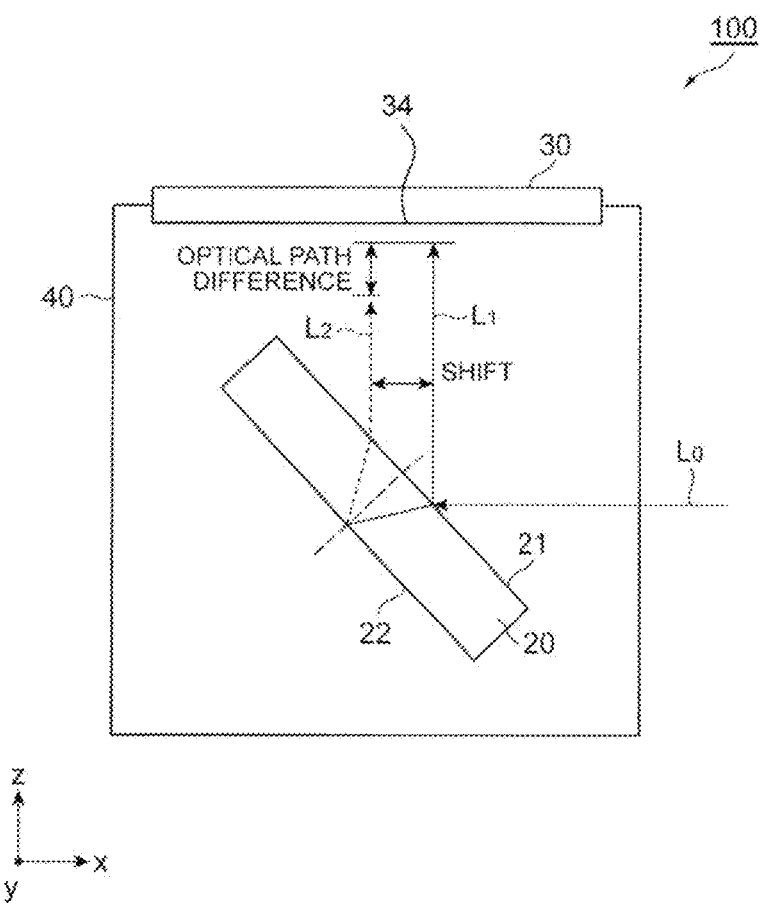
FIG. 1 is a diagram illustrating a configuration of a collimation evaluation device 100 according to a comparative example.

FIG. 1 is a diagram illustrating a configuration of a collimation evaluation device 100 according to a comparative example. The collimation evaluation device 100 according to the comparative example includes a reflection member 20, a screen 30, and a housing 40. The reflection member 20 and the screen 30 are fixed to the housing 40. It is assumed that a direction where light $L_0$ of a collimation evaluation object is incident into the collimation evaluation device 100 is parallel to an x axis.

The reflection member 20 is a shear plate made of a transparent flat plate that has a first reflection surface 21 and a second reflection surface 22 opposite to each other. A material of the transparent flat plate is, for example, BK7 or synthetic quartz. The reflection member 20 is disposed to reflect the light $L_0$ incident in parallel to the x axis and emit the reflected light in parallel to a z axis. Flatness of the first reflection surface 21 and the second reflection surface 22 is about a fraction of a wavelength of evaluation object light. The first reflection surface 21 and the second reflection surface 22 are non-parallel to each other, a distance between the reflection surfaces changes along a direction parallel to a y axis, and the surfaces form an angle (wedge angle) of about several seconds to several tens of seconds.

The screen 30 is a ground glass plate that is disposed to be parallel to both of the x axis and the y axis. Reflected light components $L_1$ and $L_2$ that are respectively reflected on the first reflection surface 21 and the second reflection surface 22 of the reflection member 20 are incident on the screen 30. Interference fringes 34 are formed on the screen 30 by the two light components $L_1$ and $L_2$, and the interference fringes 34 can be observed.

In the collimation evaluation device 100, the evaluation object light $L_0$ is incident on the reflection member 20 in parallel to the x axis. A part of the incident light $L_0$ is reflected on the first reflection surface 21 and the reflected light $L_1$ thereof is incident on the screen 30 in parallel to the z axis. In the incident light $L_0$, light transmitted through the first reflection surface 21 is reflected on the second reflection surface 22 and the reflected light $L_2$ thereof is incident on the screen 30 in parallel to the z axis. The reflected light component $L_1$ and the reflected light component $L_2$ incident on the screen 30 are shifted in a direction parallel to the x axis by a distance according to a thickness of the reflection member 20 and an optical path difference according to the thickness of the reflection member 20 is generated.

Figure 2:
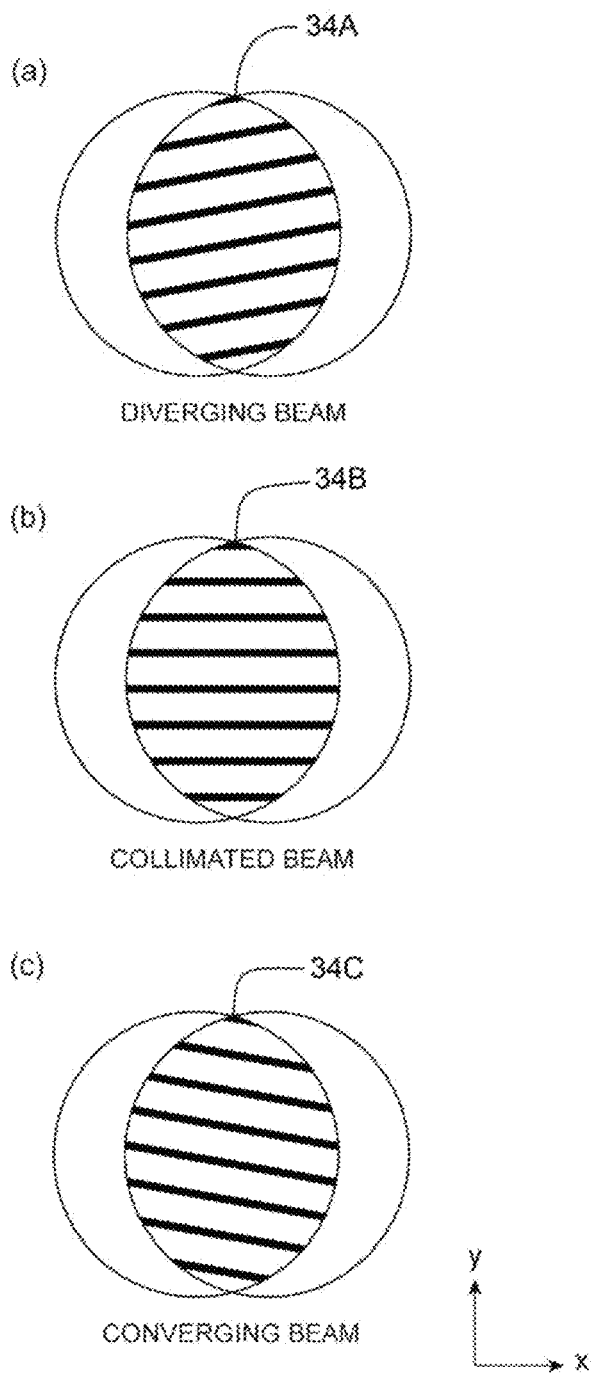
FIG. 2 includes (a)-(c) diagrams illustrating interference fringes formed on a screen 30 of the collimation evaluation device 100 according to the comparative example.

FIG. 2 includes diagrams illustrating interference fringes formed on the screen 30 of the collimation evaluation device 100 according to the comparative example. The interference fringes formed on the screen 30 is a vector sum of a component caused by non-parallelism of the first reflection surface 21 and the second reflection surface 22 of the reflection member 20 and a component caused by non-parallelism of the incident light $L_0$.

When the incident light $L_0$ is collimated light, the interference fringes formed on the screen 30 include only the component caused by the non-parallelism of the first reflection surface 21 and the second reflection surface 22, and do not include the component caused by the non-parallelism of the incident light $L_0$, and for this reason, the interference fringes 34B are parallel to the x axis as illustrated in (b) in FIG. 2.

When the incident light $L_0$ is diverging light or converging light, the interference fringes formed on the screen 30 include the component caused by the non-parallelism of the first reflection surface 21 and the second reflection surface 22, and in addition, the component caused by the non-parallelism of the incident light $L_0$, and for this reason, the interference fringes are inclined with respect to the x axis as illustrated in (a) and (c) in FIG. 2. In the interference fringes 34A ((a) in FIG. 2) when the incident light $L_0$ is the diverging light and the interference fringes 34C ((c) in FIG. 2) when the incident light $L_0$ is the converging light, inclination directions are opposite to each other.

As such, the collimation of the incident light $L_0$ can be evaluated and the collimation of the light $L_0$ can be adjusted, on the basis of a direction of the interference fringes 34 formed on the screen 30. When a reference line is drawn on the screen 30 and the interference fringes 34 are parallel to the reference line, it can be determined that the incident light $L_0$ is the collimated light.

In the collimation evaluation device 100 according to the comparative example described above, it is preferable to increase the thickness of the reflection member 20 to be the shear plate, to detect the change in the direction of the interference fringes 34 with respect to the reference line on the screen 30 with high sensitivity. However, when the thickness of the reflection member 20 increases, an optical path difference between the reflected light $L_1$ and the reflected light $L_2$ arriving at the screen 30 increases. Meanwhile, when the optical path difference is shorter than the coherence length of the evaluation object light $L_0$, the interference fringes 34 can be observed on the screen 30.

When the thickness of the reflection member 20 is increased to improve the sensitivity, the optical path difference increases and a collimation evaluation of light of which the coherence length is shorter than the optical path difference cannot be performed. As such, in the collimation evaluation device 100 according to the comparative example, it is difficult to evaluate the collimation of the light of which the coherence length is short with high sensitivity.

(First Embodiment)

Figure 3:
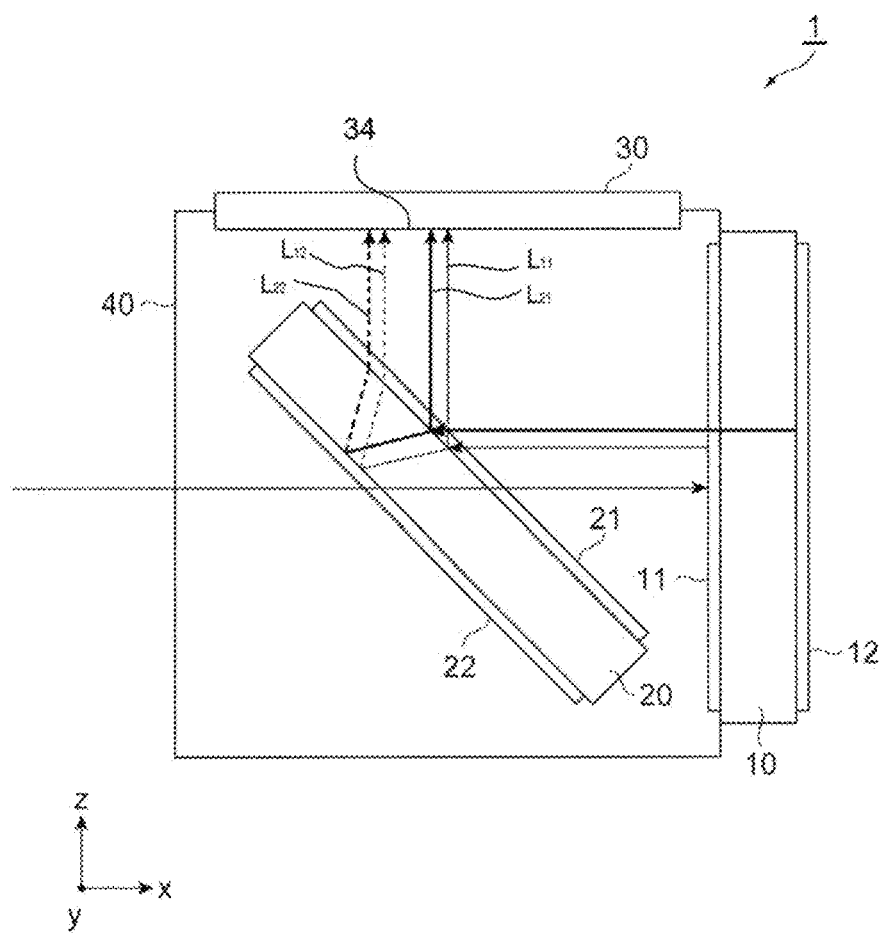
FIG. 3 is a diagram illustrating a configuration of a collimation evaluation device 1 according to a first embodiment.

FIG. 3 is a diagram illustrating a configuration of a collimation evaluation device 1 according to a first embodiment. The collimation evaluation device 1 according to the first embodiment includes a first reflection member 10, a second reflection member 20, a screen 30, and a housing 40. The first reflection member 10, the second reflection member 20, and the screen 30 are fixed to the housing 40. It is assumed that a direction where light $L_0$ of a collimation evaluation object is incident on the collimation evaluation device 1 is parallel to an x axis.

The first reflection member 10 is a transparent flat plate that has a first reflection surface 11 for reflecting a part of incident light and a second reflection surface 12 for reflecting light transmitted through the first reflection surface 11 in the light. The second reflection member 20 is a transparent flat plate that has a first reflection surface 21 for reflecting a part of incident light and a second reflection surface 22 for reflecting light transmitted through the first reflection surface 21 in the light. A material of the transparent flat plate is BK7 or synthetic quartz, for example.

The first reflection member 10 is disposed such that, when light being incident in parallel to the x axis and transmitted through the second reflection member 20 is incident, the first reflection member reflects a part of the light by the first reflection surface 11, reflects the light transmitted through the first reflection surface 11 in the light by the second reflection surface 12, and emits these reflected light components in an opposite direction. The second reflection member 20 is disposed such that, when the light emitted from the first reflection member 10 is incident, the second reflection member reflects a part of the light by the first reflection surface 21, reflects the light transmitted through the first reflection surface 21 in the light by the second reflection surface 22, and emits these reflected light components in parallel to a z axis.

Flatness of each of the reflection surfaces 11, 12, 21, and 22 is about a fraction of a wavelength of evaluation object light. In the first reflection member 10, the first reflection surface 11 and the second reflection surface 12 are parallel to each other. The second reflection member 20 is a shear plate in which the first reflection surface 21 and the second reflection surface 22 are non-parallel to each other, a distance between the reflection surfaces changes along a direction parallel to the y axis, and the reflection surfaces form an angle (wedge angle) of about several seconds to several tens of seconds.

The screen 30 is a ground glass plate that is disposed to be parallel to both of the x axis and the y axis. Here, light reflected on the first reflection surface 11 of the first reflection member 10 and the first reflection surface 21 of the second reflection member 20 is represented as $L_{11}$. Light reflected on the first reflection surface 11 of the first reflection member 10 and the second reflection surface 22 of the second reflection member 20 is represented as $L_{12}$. Light reflected on the second reflection surface 12 of the first reflection member 10 and the first reflection surface 21 of the second reflection member 20 is represented as $L_{21}$. Further, light reflected on the second reflection surface 12 of the first reflection member 10 and the second reflection surface 22 of the second reflection member 20 is represented as $L_{22}$. These reflected light components $L_{11}$, $L_{12}$, $L_{21}$, and $L_{22}$ are incident on the screen 30.

On the screen 30, the components having optical path differences shorter than a coherence length among these reflected light components $L_{11}$, $L_{12}$, $L_{21}$, and $L_{22}$ interfere with each other, and thus, interference fringes 34 are formed, and the interference fringes 34 can be observed. The screen 30 is an observation unit that enables an observation of the interference fringes 34. A direction of interference fringes 34 caused by non-parallelism of the first reflection surface 21 and the second reflection surface 22 in the second reflection member 20 and a direction of interference fringes 34 caused by non-parallelism of the incident light are different from each other.

A magnitude relation of the optical path lengths of the reflected light components $L_{11}$, $L_{12}$, $L_{21}$, and $L_{22}$ is as follows. The optical path lengths of these reflected light components are different according to whether light propagates between the first reflection surface 11 and the second reflection surface 12 of the first reflection member 10, and whether light propagates between the first reflection surface 21 and the second reflection surface 22 of the second reflection member 20. Therefore, as compared with the optical path lengths of the reflected light components $L_{12}$ and $L_{21}$, the optical path length of the reflected light component $L_{11}$ is short and the optical path length of the reflected light component $L_{22}$ is long.

When the thickness of each of the first reflection member 10 and the second reflection member 20 is appropriately set, the optical path lengths of the reflected light components $L_{12}$ and $L_{21}$ can be set almost equally and an optical path difference between the reflected light components $L_{12}$ and $L_{21}$ can be set to be smaller than the coherence length. That is, the interference fringes 34 can be formed on the screen 30 by the light $L_{12}$ reflected on the first reflection surface 11 of the first reflection member 10 and the second reflection surface 22 of the second reflection member 20 and the light $L_{21}$ reflected on the second reflection surface 12 of the first reflection member 10 and the first reflection surface 21 of the second reflection member 20.

When a reference line is drawn on the screen 30 and the interference fringes 34 are parallel to the reference line, it can be determined that the incident light is the collimated light, and by inclinations of the interference fringes 34 with respect to the reference line, it can be determined that the incident light is diverging light or converging light.

A collimation evaluation method according to this embodiment observes the interference fringes 34 formed by the reflected light component $L_{12}$ and the reflected light component $L_{21}$ on the screen 30 on which the light components are incident, using the first reflection member 10, the second reflection member 20, and the screen 30 described above, and evaluates the collimation of the incident light on the basis of the direction of the observed interference fringes 34.

In this embodiment, even when the thickness of the second reflection member 20 is large to improve the sensitivity, and the coherence length of the light of the collimation evaluation object is short, the optical path difference between the reflected light components $L_{12}$ and $L_{21}$ can be set to be smaller than the coherence length, and therefore, the collimation of the light can be evaluated with high sensitivity.

The collimation evaluation device 1 according to this embodiment corresponds to the case in which the first reflection member 10 for optical path difference correction is added to the same configuration (that is, the configuration including the second reflection member 20, the screen 30, and the housing 40) as the configuration of the collimation evaluation device 100 according to the comparative example and the incident direction of the evaluation object light is reversed.

Therefore, if there is a commercially available collimation evaluation device having the same configuration as the configuration of the collimation evaluation device 100 according to the comparative example, the collimation evaluation device 1 according to the embodiment can be configured by attaching the first reflection member 10 for optical path difference correction to the commercially available collimation evaluation device. As attachment methods, there are a method of attaching the first reflection member 10 to a housing of the commercially available collimation evaluation device by an adhesive or an adhesive tape, a method of attaching the first reflection member 10 to the housing of the commercially available collimation evaluation device by a holder having an adjustment mechanism, and a method of removably attaching the first reflection member 10 to the housing of the commercially available collimation evaluation device by a magnet.

(Second Embodiment)

Figure 4:
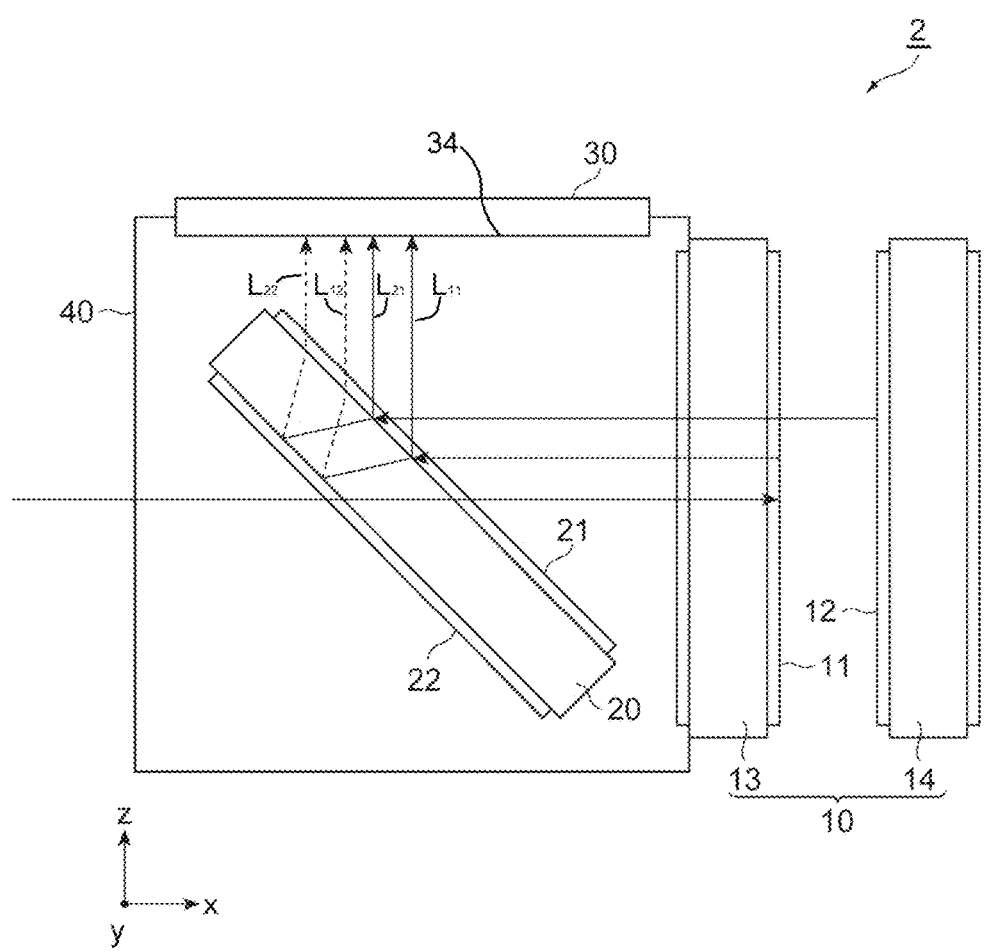
FIG. 4 is a diagram illustrating a configuration of a collimation evaluation device 2 according to a second embodiment.

FIG. 4 is a diagram illustrating a configuration of a collimation evaluation device 2 according to a second embodiment. The collimation evaluation device 2 according to the second embodiment illustrated in FIG. 4 is different from the collimation evaluation device 1 according to the first embodiment illustrated in FIG. 3 in a configuration of a first reflection member 10.

The first reflection member 10 according to the second embodiment includes a first flat plate 13 that has a first reflection surface 11 and a second flat plate 14 that is disposed in parallel to the first flat plate 13 and has a second reflection surface 12. The first reflection surface 11 of the first flat plate 13 and the second reflection surface 12 of the second flat plate 14 face each other and are parallel to each other. A reflection reduction film is preferably formed on a surface opposite to the first reflection surface 11 of the first flat plate 13. In addition, a reflection reduction film is preferably formed on a surface opposite to the second reflection surface 12 of the second flat plate 14.

In the second embodiment, the same operation and the same effect as the first embodiment are achieved. Further, in the second embodiment, a distance between the first flat plate 13 and the second flat plate 14, that is, a distance between the first reflection surface 11 and the second reflection surface 12 is preferably variable. In this way, an optical path difference of reflected light components $L_{12}$ and $L_{21}$ incident on the screen 30 can be adjusted, and the optical path difference can be set according to a coherence length of the light.

To vary the distance between the first flat plate 13 and the second flat plate 14, a movement mechanism for moving both or one of the first flat plate 13 and the second flat plate 14 in a direction parallel to the x axis may be provided. A stage having high position precision or an annular shim is preferably used as the movement mechanism.

FIG. 5 and FIG. 6 include photographs of interference fringes 34 observed on the screen 30 of the collimation evaluation device 2 according to the second embodiment. Light of a collimation evaluation object is laser light emitted from an optical fiber end face of an optical fiber laser light source and having a wavelength of 1080 nm and a coherence length of 0.6 mm and is incident on the collimation evaluation device 2 via a lens. The distance between the first flat plate 13 and the second flat plate 14 (that is, the distance between the first reflection surface 11 and the second reflection surface 12) is changed continuously by 0.20 mm in a range of 2.95 mm to 3.95 mm and interference fringes 34 formed on the screen 30 in the case of each distance are photographed.

(a) in FIG. 5 is a photograph of interference fringes 34D in the case of a distance of 2.95 mm, (b) in FIG. 5 is a photograph of interference fringes 34E in the case of a distance of 3.15 mm, and (c) in FIG. 5 is a photograph of interference fringes in 34F the case of a distance of 3.35 mm. (a) in FIG. 6 is a photograph of interference fringes 34G in the case of a distance of 3.55 mm, (b) in FIG. 6 is a photograph of interference fringes 34H in the case of a distance of 3.75 mm, and (c) in FIG. 6 is a photograph of interference fringes 34I in the case of a distance of 3.95 mm.

As understood from these photographs, when the distance between the first flat plate 13 and the second flat plate 14 is 3.55 mm ((a) in FIG. 6), the optical path difference of the reflected light components $L_{12}$ and $L_{21}$ incident on the screen 30 can be minimized and contrast of the interference fringes 34 is most favorable. When the distance becomes larger than 3.55 mm or becomes smaller than 3.55 mm, the contrast of the interference fringes 34 is deteriorated.

As such, the distance between the first flat plate 13 and the second flat plate 14 of the first reflection member 10 is set according to the thickness of the second reflection member 20, such that the optical path difference of the reflected light components $L_{12}$ and $L_{21}$ generated at the time of reflection in the first reflection member 10 and the optical path difference of the reflected light components $L_{12}$ and $L_{21}$ generated at the time of reflection in the second reflection member 20 are canceled. As a result, even when the thickness of the second reflection member 20 is large to improve sensitivity or the coherence length of the light of the collimation evaluation object is short, the distance between the first flat plate 13 and the second flat plate 14 is appropriately set, so that the optical path difference between the reflected light components $L_{12}$ and $L_{21}$ can be set to be smaller than the coherence length, and therefore, collimation of the light can be evaluated with high sensitivity.

(Third Embodiment)

Figure 7:
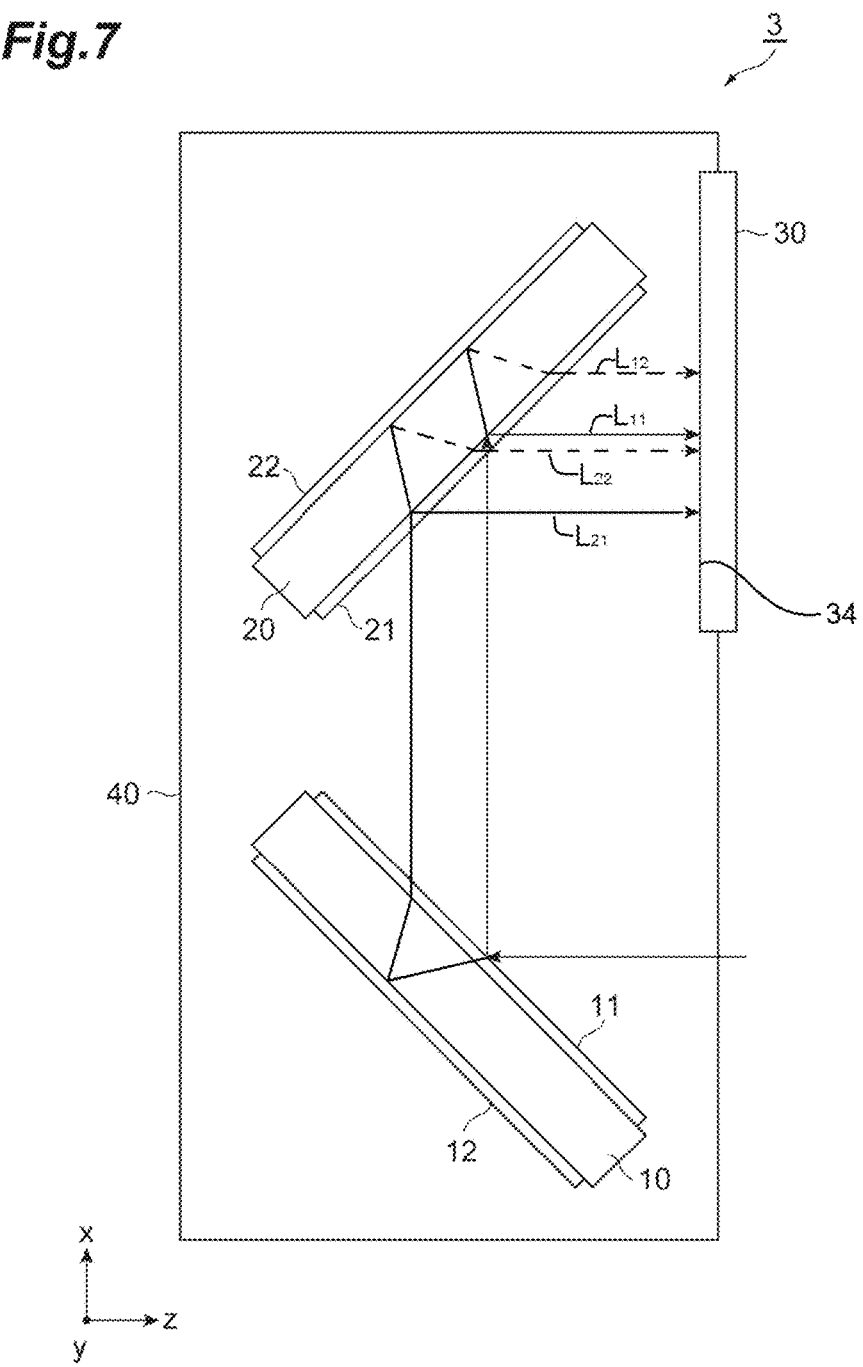
FIG. 7 is a diagram illustrating a configuration of a collimation evaluation device 3 according to a third embodiment.

FIG. 7 is a diagram illustrating a configuration of a collimation evaluation device 3 according to a third embodiment. The collimation evaluation device 3 according to the third embodiment includes a first reflection member 10, a second reflection member 20, a screen 30, and a housing 40. The first reflection member 10, the second reflection member 20, and the screen 30 are fixed to the housing 40. It is assumed that a direction where light of a collimation evaluation object is incident on the collimation evaluation device 3 is parallel to a z axis.

The first reflection member 10, the second reflection member 20, and the screen 30 according to the third embodiment are the same as those in the first embodiment, except for an arrangement thereof. The first reflection member 10 is disposed such that, when light is incident in parallel to the z axis, the first reflection member reflects a part of the light by a first reflection surface 11, reflects light transmitted through the first reflection surface 11 in the light by a second reflection surface 12, and emits these reflected light components in a direction parallel to an x axis. The second reflection member 20 is disposed such that, when the light emitted from the first reflection member 10 is incident, the second reflection member reflects a part of the light by a first reflection surface 21, reflects light transmitted through the first reflection surface 21 in the light by a second reflection surface 22, and emits these reflected light components in parallel to the z axis.

The screen 30 is a ground glass plate that is disposed to be parallel to both of the x axis and the y axis. Reflected light components $L_{11}$, $L_{12}$, $L_{21}$, and $L_{22}$ are incident on the screen 30. Even in this embodiment, when a thickness of each of the first reflection member 10 and the second reflection member 20 is appropriately set, optical path lengths of the reflected light components $L_{12}$ and $L_{21}$ can be set almost equally and an optical path difference between the reflected light components $L_{12}$ and $L_{21}$ can be set to be smaller than a coherence length. That is, interference fringes 34 can be formed on the screen 30 by the light $L_{12}$ reflected on the first reflection surface 11 of the first reflection member 10 and the second reflection surface 22 of the second reflection member 20 and the light $L_{21}$ reflected on the second reflection surface 12 of the first reflection member 10 and the first reflection surface 21 of the second reflection member 20.

Even in this embodiment, even when the thickness of the second reflection member 20 is large to improve sensitivity or the coherence length of the light of the collimation evaluation object is short, the optical path difference of the reflected light components $L_{12}$ and $L_{21}$ can be set to be smaller than the coherence length, and therefore, collimation of the light can be evaluated with high sensitivity.

In the first embodiment, because the evaluation object light is incident on the first reflection member 10 after being transmitted through the second reflection member 20, the light is lost at the time of transmission in the second reflection member 20. On the other hand, in the third embodiment, because the evaluation object light can be directly incident on the first reflection member 10 without transmission in the second reflection member 20, there is no loss due to transmission in the second reflection member 20.

(Fourth Embodiment)

Figure 8:
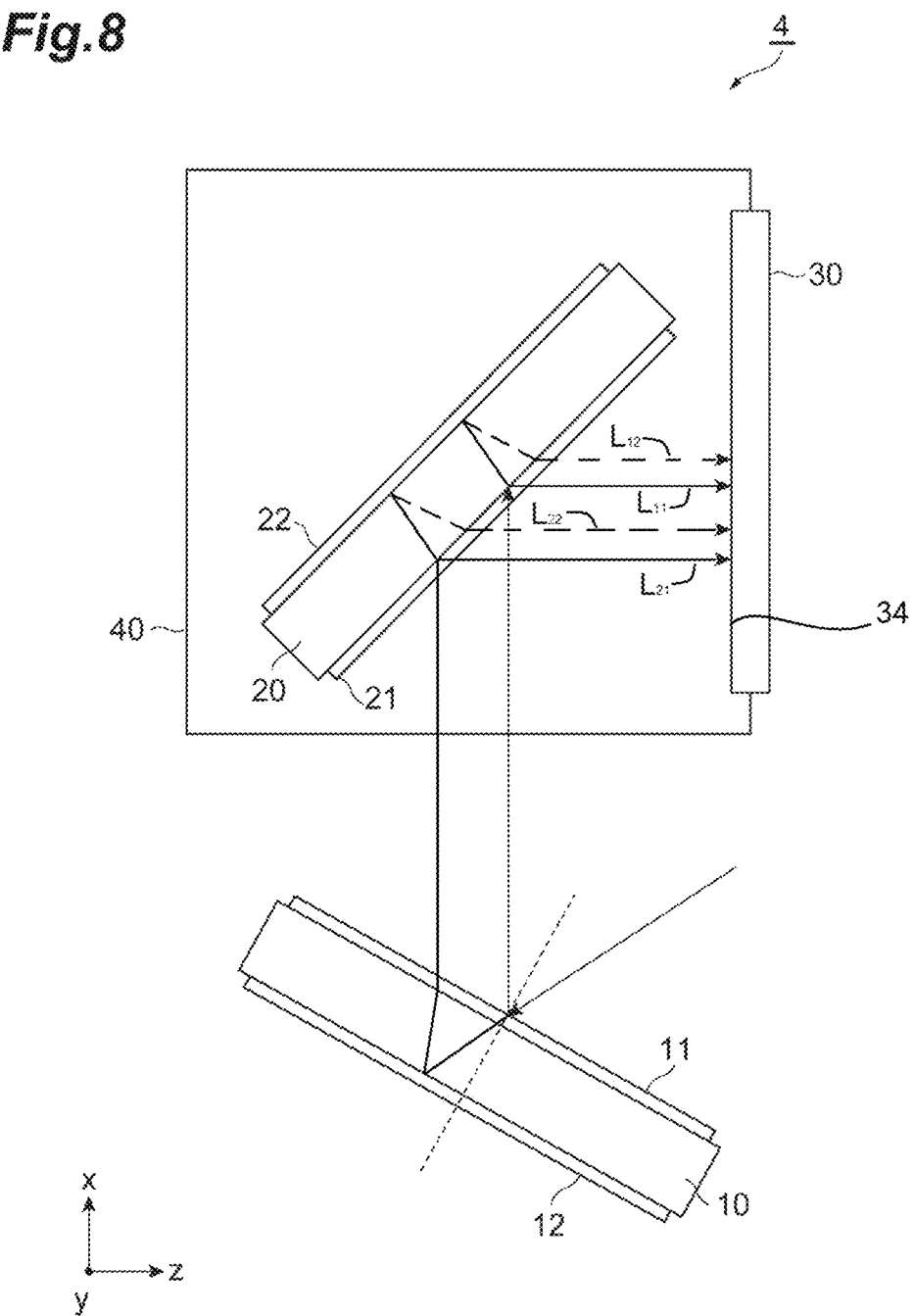
FIG. 8 is a diagram illustrating a configuration of a collimation evaluation device 4 according to a fourth embodiment.

FIG. 8 is a diagram illustrating a configuration of a collimation evaluation device 4 according to a fourth embodiment. The collimation evaluation device 4 according to the fourth embodiment illustrated in FIG. 8 is different from the collimation evaluation device 3 according to the third embodiment illustrated in FIG. 7 in an arrangement of a first reflection member 10.

In the first reflection member 10 according to the third embodiment, the first reflection surface 11 and the second reflection surface 12 are disposed to be inclined to both the x axis and the z axis by 45 degrees and both an incident angle and a reflection angle of light are 45 degrees. On the other hand, in the first reflection member 10 according to the fourth embodiment, the first reflection surface 11 and the second reflection surface 12 are disposed to be rotatable about an axis parallel to the y axis, and an incident angle and an emission angle of the light are variable. Further, in the fourth embodiment, a direction of light incident on the first reflection member 10 is set such that light reflected on the first reflection member 10 is emitted in parallel to the x axis.

In this embodiment, a direction of the first reflection member 10 is adjusted according to a thickness of the second reflection member 20, such that an optical path difference of reflected light components $L_{12}$ and $L_{21}$ generated at the time of reflection in the first reflection member 10 and an optical path difference of reflected light components $L_{12}$ and $L_{21}$ generated at the time of reflection in the second reflection member 20 are canceled. The direction of the first reflection member 10 is adjusted, so that the optical path difference of the reflected light components $L_{12}$ and $L_{21}$ generated at the time of the reflection in the first reflection member 10 can be adjusted. As a result, even when the thickness of the second reflection member 20 is large to improve sensitivity or the coherence length of the light of the collimation evaluation object is short, the direction of the first reflection member 10 is adjusted, so that the optical path difference between the reflected light components $L_{12}$ and $L_{21}$ can be set to be smaller than the coherence length, and therefore, collimation of the light can be evaluated with high sensitivity.

(Fifth Embodiment)

FIG. 9 includes diagrams illustrating a configuration of a collimation evaluation device 5 according to a fifth embodiment. (a) in FIG. 9 is a top view when viewed from a direction parallel to a z axis (direction vertical to a screen 30). (b) in FIG. 9 is a side view when viewed from a direction parallel to a y axis. In (a) in FIG. 9, illustration of the screen 30 is omitted.

The collimation evaluation device 5 according to the fifth embodiment illustrated in FIG. 9 is different from the collimation evaluation device 1 according to the first embodiment illustrated in FIG. 3 in a configuration of a first reflection member 10.

In the first embodiment, the first reflection surface 11 and the second reflection surface 12 of the first reflection member 10 are parallel to each other. On the other hand, in the fifth embodiment, the first reflection surface 11 and the second reflection surface 12 of the first reflection member 10 are non-parallel to each other, a distance between the reflection surfaces changes along one direction, and the reflection surfaces form an angle (wedge angle) of about several seconds to several tens of seconds. That is, in the fifth embodiment, both of the first reflection member 10 and the second reflection member 20 are shear plates. In addition, in the fifth embodiment, the first reflection member 10 is preferably disposed to be rotatable about an axis perpendicular to an x axis.

FIG. 10 and FIG. 11 include diagrams illustrating an example of a function of the collimation evaluation device 5 according to the fifth embodiment. (a) in FIG. 10 and (a) in FIG. 11 are each a top view of the collimation evaluation device 5 according to the fifth embodiment. Further, (b) in FIG. 10 and (b) in FIG. 11 are each a diagram illustrating interference fringes 34J and 34K, respectively, observed in the case of (a) in the corresponding figure. In these drawings, illustration of the screen 30 is omitted.

In any case, in the second reflection member 20, a distance between the first reflection surface 21 and the second reflection surface 22 decreases toward a +y direction.

In an example illustrated in (a) in FIG. 10, in the first reflection member 10, a distance between the first reflection surface 11 and the second reflection surface 12 decreases toward the +y direction. That is, wedge directions of the first reflection member 10 and the second reflection member 20 are equal to each other. In this case, as illustrated in (b) in FIG. 10, the spacing of the interference fringes 34J increases.

In an example illustrated in (a) in FIG. 11, in the first reflection member 10, a distance between the first reflection surface 11 and the second reflection surface 12 increases toward the +y direction. That is, wedge directions of the first reflection member 10 and the second reflection member 20 are opposite to each other. In this case, as illustrated in (b) in FIG. 11, the spacing of the interference fringes 34K decreases.

The interference fringe spacing depends on a sum of wedge angles of the first reflection member 10 and the second reflection member 20 and depends on a wavelength of light of a collimation evaluation object. The wedge angle of the first reflection member 10 is set to $\theta_1$ and the wedge angle of the second reflection member 20 is set to $\theta_2$, for example, $\theta_1=\theta_2/3$ is set. At this time, a total wedge angle in the case in which the wedge directions of the first reflection member 10 and the second reflection member 20 are opposite to each other becomes $2\theta_2/3$. A total wedge angle in the case in which the wedge directions of the first reflection member 10 and the second reflection member 20 are equal to each other becomes $4\theta_2/3$, and becomes twice the total wedge angle in the case in which the wedge directions are opposite to each other.

Therefore, when the wedge directions of the first reflection member 10 and the second reflection member 20 are set to be equal to each other in the case in which collimation of light of a certain wavelength $\lambda$ is evaluated, and the wedge directions of the first reflection member 10 and the second reflection member 20 are set to be opposite to each other in the case in which collimation of light of second harmonic $\lambda/2$ is evaluated, the spacing of the interference fringes can be set equally in both of the cases.

FIG. 12 and FIG. 13 include diagrams illustrating another example of a function of the collimation evaluation device 5 according to the fifth embodiment. (a) in FIG. 12 and (a) in FIG. 13 are each a top view of the collimation evaluation device 5 according to the fifth embodiment. (b) in FIG. 12 and (b) in FIG. 13 are each a diagram illustrating interference fringes 34L and 34M, respectively, observed in the case of (a) in the corresponding figure. In these drawings, illustration of the screen 30 is omitted, however, a reference line A drawn on the screen 30 is shown.

In any case, in the second reflection member 20, a distance between the first reflection surface 21 and the second reflection surface 22 decreases toward the approximately +y direction, however, because precision of attachment to the housing 40 or the like is insufficient, the wedge direction is inclined slightly from the y direction.

In an example illustrated in (a) in FIG. 12, in the first reflection member 10, a distance between the first reflection surface 11 and the second reflection surface 12 increases toward the +y direction and the wedge direction becomes the y direction accurately. In this case, even when evaluation object light is favorable collimated light, interference fringes 34L are inclined with respect to the reference line A, as illustrated in (b) in FIG. 12.

In an example illustrated in (a) in FIG. 13, in the first reflection member 10, a distance between the first reflection surface 21 and the second reflection surface 22 increases toward the approximately +y direction, however, the wedge direction is inclined slightly from the y direction. The inclination of the wedge direction of the first reflection member 10 is set to cancel the inclination of the wedge direction of the second reflection member 20. In this case, when the evaluation object light is favorable collimated light, interference fringes 34M are parallel to the reference line A, as illustrated in (b) in FIG. 13.

As such, even when the wedge direction of the second reflection member 20 is inclined slightly from the y direction because, for example, precision of attachment of the second reflection member 20 to the housing 40 is insufficient, collimation of the evaluation object light can be evaluated accurately by adjusting the wedge direction of the first reflection member 10.

Figure 14:
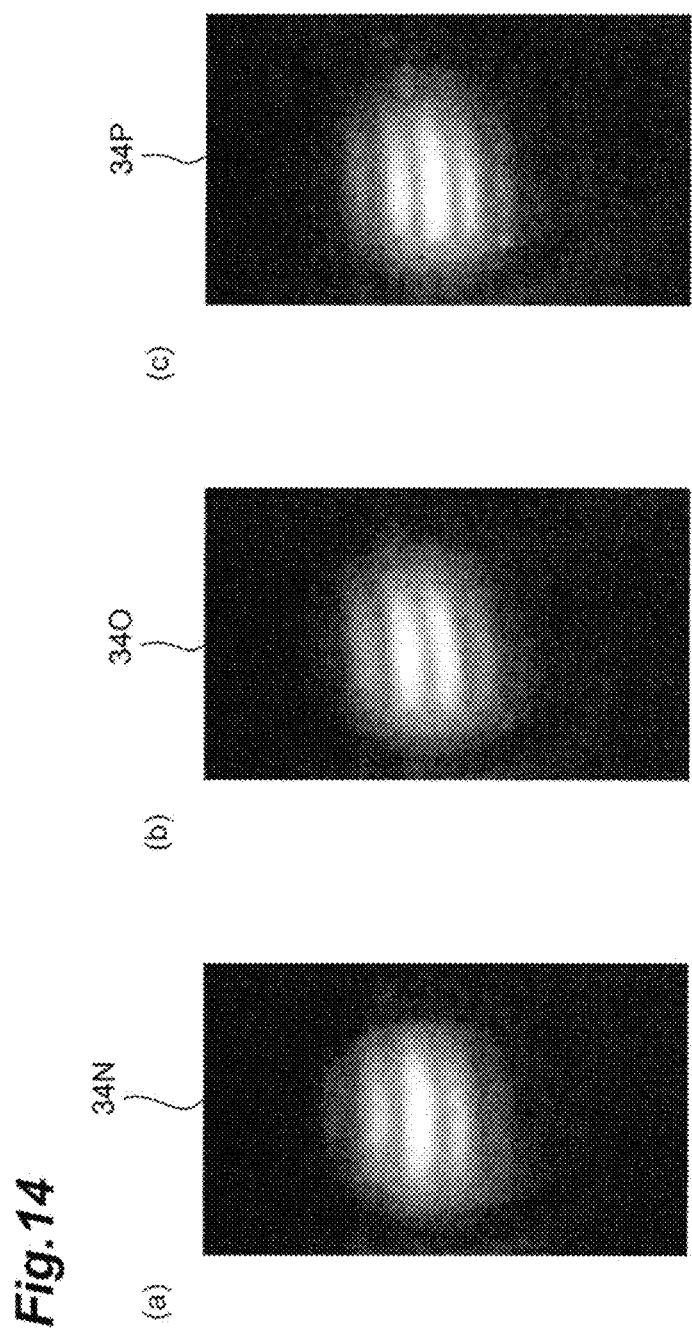
FIG. 14 includes (a)-(c) photographs of interference fringes observed on the screen 30 of the collimation evaluation device 5 according to the fifth embodiment.

FIG. 14 includes photographs of interference fringes observed on the screen 30 of the collimation evaluation device 5 according to the fifth embodiment. Light of the collimation evaluation object is laser light emitted from an optical fiber end face of an optical fiber laser light source and having a wavelength of 1080 nm and a coherence length of 0.6 mm, and is incident on the collimation evaluation device 5 via a lens. The wedge direction of the first reflection member 10 is changed continuously by 90 degrees and interference fringes formed on the screen 30 in the case of each wedge direction are photographed. As compared with the wedge direction of the first reflection member 10 when the interference fringes 34N of (a) in FIG. 14 are photographed, (b) in FIG. 14 illustrates interference fringes 34O when the wedge direction of the first reflection member 10 is rotated by 90 degrees, and (c) in FIG. 14 illustrates interference fringes 34P when the wedge direction of the first reflection member 10 is rotated by 180 degrees.

When (a) in FIG. 14 and (c) in FIG. 14 are compared with each other, the spacing of the interference fringes 34N illustrated in (a) in FIG. 14 is large, and the spacing of the interference fringes 34P illustrated in (c) in FIG. 14 is small. Further, when (a) and (c) in FIG. 14 and (b) in FIG. 14 are compared with each other, the interference fringes 34N and 34P respectively illustrated in (a) and (c) in FIG. 14 are parallel to the reference line, and the interference fringes 34O illustrated in (b) in FIG. 14 are inclined to the reference line. As such, the function of the collimation evaluation device 5 described using FIG. 10 to FIG. 13 is confirmed by FIG. 14.

(Modifications)

The present invention is not limited to the embodiments described above and various modifications can be made. For example, in the configuration of the collimation evaluation device according to each embodiment, the transmission-type screen 30 made of the ground glass plate is used as the observation unit to enable the interference fringes formed by the reflected light components $L_{12}$ and $L_{21}$ to be observed and the interference fringes are observed by the light transmitted and diffused through the screen 30. However, the observation unit to enable the interference fringes to be observed is not limited thereto. FIG. 15 to FIG. 18 are diagrams illustrating configurations of modifications of the collimation evaluation device 1 according to the first embodiment. In these modifications, other configuration is adopted as the observation unit to enable the interference fringes to be observed.

Figure 15:
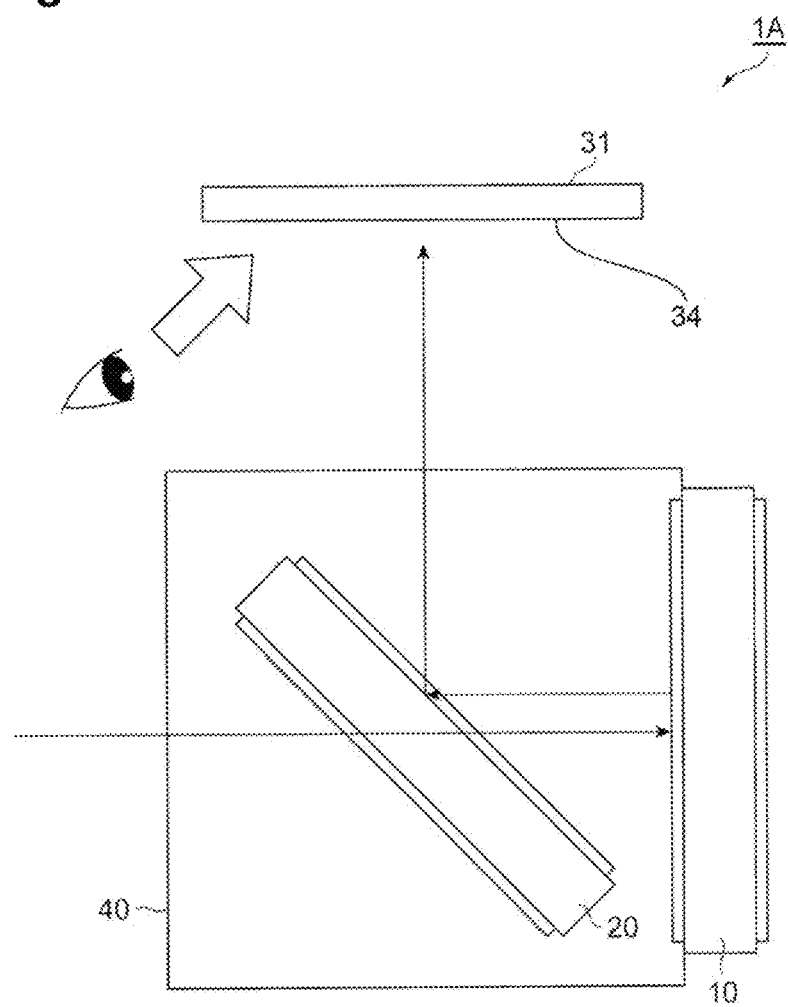
FIG. 15 is a diagram illustrating a configuration of a first modification of the collimation evaluation device according to the first embodiment.

A collimation evaluation device 1A according to a first modification illustrated in FIG. 15 uses a reflection-type screen 31 as an observation unit and observes interference fringes 34 by light reflected and diffused by the screen 30. In the case of this configuration, the device is suitable from the viewpoint of safety of an observer, when interference fringes of light having high intensity are observed.

Figure 16:
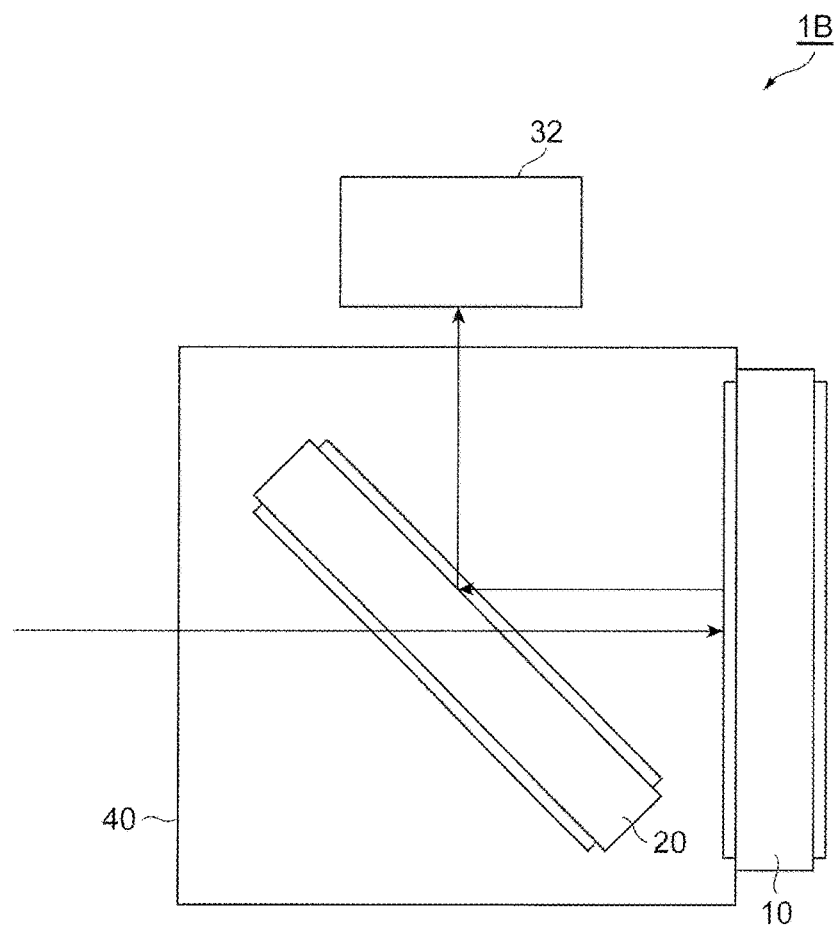
FIG. 16 is a diagram illustrating a configuration of a second modification of the collimation evaluation device according to the first embodiment.

A collimation evaluation device 1B according to a second modification illustrated in FIG. 16 uses a camera 32 as an observation unit, displays interference fringes imaged by the camera 32 on a display device, and observes the interference fringes. In the case of this configuration, even when light is light of a wavelength region (an ultraviolet region, an infrared region, and the like) other than visible light, the interference fringes can be observed.

Figure 17:
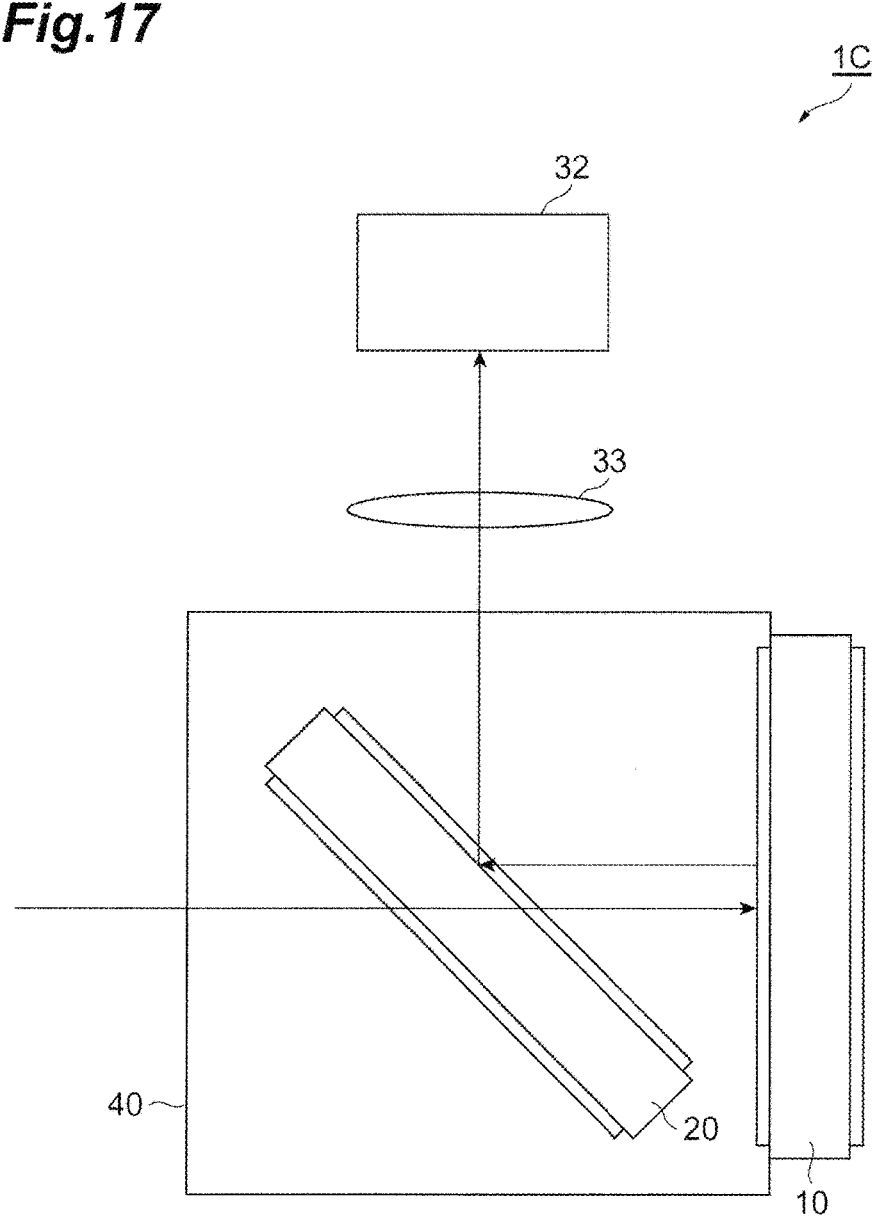
FIG. 17 is a diagram illustrating a configuration of a third modification of the collimation evaluation device according to the first embodiment.

A collimation evaluation device 1C according to a third modification illustrated in FIG. 17 uses a lens 33 and a camera 32 as an observation unit, images interference fringes enlarged or reduced by the lens 33 by the camera 32, displays the imaged interference fringes on a display device, and observes the interference fringes. In the case of this configuration, even when light is light of a wavelength region other than visible light, the interference fringes can be observed, and further, the interference fringes can be observed in a desired field of view by changing magnification.

Figure 18:
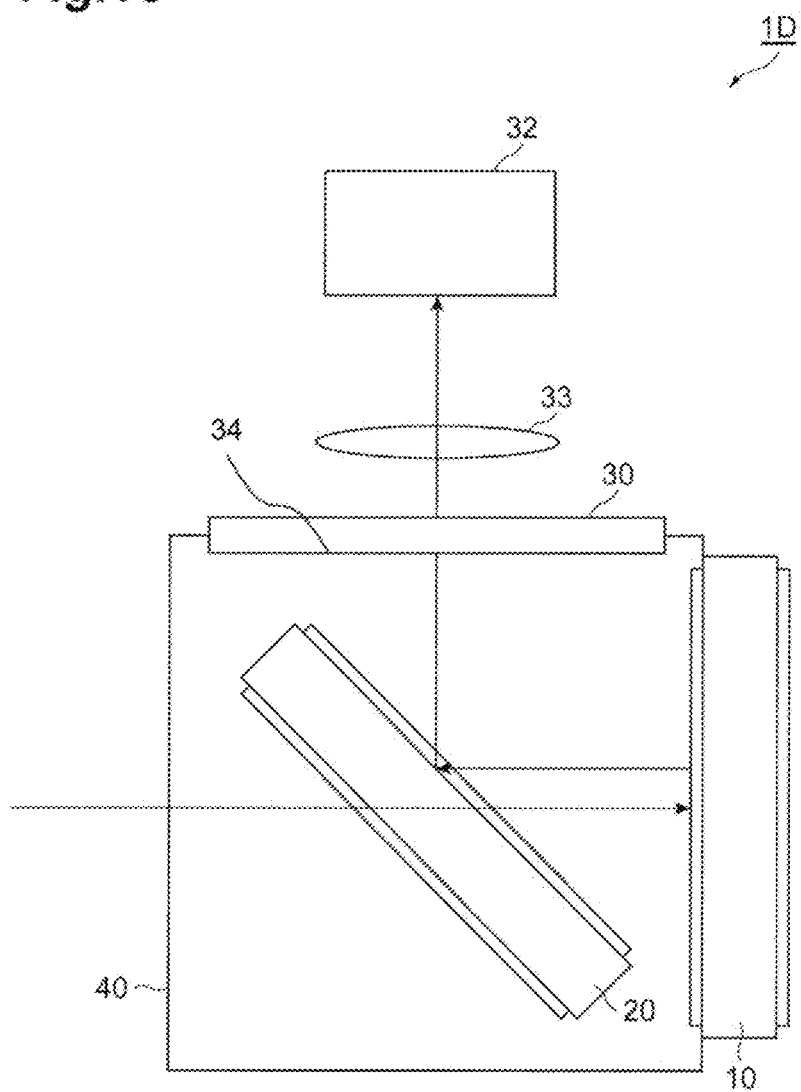
FIG. 18 is a diagram illustrating a configuration of a fourth modification of the collimation evaluation device according to the first embodiment.

A collimation evaluation device 1D according to a fourth modification illustrated in FIG. 18 uses a transmission-type screen 30, a lens 33, and a camera 32 as an observation unit, enlarges or reduces interference fringes 34 on the screen 30 by the lens 33, images the interference fringes by the camera 32, displays the imaged interference fringes on a display device, and observes the interference fringes. In the case of this configuration, even when light is light of a wavelength region other than visible light, the interference fringes can be observed, and further, the interference fringes of desired spacing can be observed by changing magnification. In addition, inclinations of the interference fringes with respect to a reference line drawn on the screen 30 can be confirmed.

The collimation evaluation devices 1B and 1C not using the screen cannot use the reference line on the screen, however, an electron line of the camera 32 can be used as the reference line.

The above-described collimation evaluation devices 1A to 1D are the modifications of the collimation evaluation device 1 according to the first embodiment, however, the same modifications can be made in the collimation evaluation devices 2 to 5 according to the other embodiments.

In the first to fourth embodiments described above, the first reflection surface 11 and the second reflection surface 12 of the first reflection member 10 are parallel to each other and the first reflection surface 21 and the second reflection surface 22 of the second reflection member 20 are non-parallel to each other. In contrast, the first reflection surface 11 and the second reflection surface 12 of the first reflection member 10 may be non-parallel to each other and the first reflection surface 21 and the second reflection surface 22 of the second reflection member 20 may be parallel to each other. Further, in both of the first reflection member 10 and the second reflection member 20, the first reflection surface and the second reflection surface may be non-parallel to each other.

In any case, the first reflection member 10 and the second reflection member 20 are disposed such that the direction of the interference fringes caused by the non-parallelism of the first reflection surface and the second reflection surface in both or one of the first reflection member 10 and the second reflection member 20 and the direction of the interference fringes caused by the non-parallelism of the incident light are different from each other. Then, the interference fringes formed by the light $L_{12}$ reflected on the first reflection surface 11 of the first reflection member 10 and the second reflection surface 22 of the second reflection member 20 and the light $L_{21}$ reflected on the second reflection surface 12 of the first reflection member 10 and the first reflection surface 21 of the second reflection member 20 are observed, so that the collimation of the incident light can be evaluated on the basis of the direction of the observed interference fringes.

Further, in the second embodiment, the first reflection member 10 is configured using the two flat plates, and in addition, the second reflection member 20 may also be configured using the two flat plates. This is applicable to the other embodiments. When the first reflection member 10 or the second reflection member 20 is configured using the two flat plates, the distance between the two flat plates is adjusted, so that the optical path difference of the reflected light components $L_{12}$ and $L_{21}$ can be adjusted. In addition, the inclinations of both or one of the two flat plates are adjusted, so that the wedge angle or the wedge direction of the reflection member can be adjusted.

The collimation evaluation device according to the embodiment is configured to include: (1) a first reflection member having a first reflection surface for reflecting a part of incident light and a second reflection surface for reflecting light transmitted through the first reflection surface in the incident light; and (2) a second reflection member having a first reflection surface for reflecting a part of light emitted from the first reflection member and a second reflection surface for reflecting light transmitted through the first reflection surface in the light, and (3) collimation of the incident light is evaluated on the basis of a direction of interference fringes formed by a light component reflected on the first reflection surface of the first reflection member and the second reflection surface of the second reflection member and a light component reflected on the second reflection surface of the first reflection member and the first reflection surface of the second reflection member.

The collimation evaluation method according to the embodiment is configured to include: (1) using a first reflection member having a first reflection surface for reflecting a part of incident light and a second reflection surface for reflecting light transmitted through the first reflection surface in the incident light, and (2) a second reflection member having a first reflection surface for reflecting a part of light emitted from the first reflection member and a second reflection surface for reflecting light transmitted through the first reflection surface in the light; (a) observing interference fringes formed by a light component reflected on the first reflection surface of the first reflection member and the second reflection surface of the second reflection member and a light component reflected on the second reflection surface of the first reflection member and the first reflection surface of the second reflection member; and (b) evaluating collimation of the incident light on the basis of a direction of the observed interference fringes.

In the evaluation device of the above configuration, preferably, the first reflection surface and the second reflection surface are non-parallel to each other in both or one of the first reflection member and the second reflection member, and a direction of interference fringes caused by non-parallelism of the first reflection surface and the second reflection surface in both or one of the first reflection member and the second reflection member and a direction of interference fringes caused by non-parallelism of the incident light are different from each other.

Likewise, in the evaluation method of the above configuration, preferably, the first reflection surface and the second reflection surface are non-parallel to each other in both or one of the first reflection member and the second reflection member, and the first reflection member and the second reflection member are disposed such that a direction of interference fringes caused by non-parallelism of the first reflection surface and the second reflection surface in both or one of the first reflection member and the second reflection member and a direction of interference fringes caused by non-parallelism of the incident light are different from each other.

Further, in the evaluation device and the evaluation method of the above configuration, both or one of the first reflection member and the second reflection member may include a flat plate having two surfaces opposite to each other as the first reflection surface and the second reflection surface.

Further, in the evaluation device and the evaluation method of the above configuration, both or one of the first reflection member and the second reflection member may include a first flat plate having the first reflection surface and a second flat plate being disposed in parallel to the first flat plate and having the second reflection surface. In this case, preferably, a distance between the first flat plate and the second flat plate (that is, a distance between the first reflection surface and the second reflection surface) is variable. By setting the distance appropriately, the optical path difference of the two reflected light components $L_{12}$ and $L_{21}$ is adjusted and the optical path difference can be set to be smaller than the coherence length, and therefore, collimation of the incident light can be evaluated with high sensitivity.

Further, in the evaluation device and the evaluation method of the above configuration, the first reflection surface and the second reflection surface may be non-parallel to each other in both of the first reflection member and the second reflection member, and both or one of the first reflection member and the second reflection member may be rotatable about an axis substantially perpendicular to the first reflection surface or the second reflection surface. In this case, the spacing of the interference fringes can be adjusted by adjusting a rotation position of the first reflection member or the second reflection member. Further, even when precision of attachment of one reflection member of the first reflection member and the second reflection member is insufficient, collimation of the incident light can be evaluated accurately by adjusting a rotation position of the other reflection member.

Further, in the above configuration, when a high-power laser is used, coating for reducing reflectance to reduce signal intensity may be provided on the reflection surfaces 21 and 22, or the reflection surfaces 11 and 12, or the four surfaces of the reflection surfaces 21, 22, 11, and 12. Further, in this case, reflectance of the reflection surfaces 21 and 22 and reflectance of the reflection surfaces 11 and 12 are preferably set to almost the same reflectance to obtain favorable contrast in the generated interference fringes. As an example of the coating, a total of two layers including individual layers of aluminum oxide $Al_2O_3$ and magnesium fluoride $MgF_2$ are laminated, so that reflectance of about 1% can be realized on a glass surface and a glass rear surface.

INDUSTRIAL APPLICABILITY

The present invention can be used as a device and a method that can evaluate collimation of light of a collimation evaluation object with high sensitivity, even when a coherence length of the light is short.

REFERENCE SIGNS LIST 1 to 5—collimation evaluation device, 10—first reflection member, 11—first reflection surface, 12—second reflection surface, 20—second reflection member, 21—first reflection surface, 22—second reflection surface, 30, 31—screen, 32—camera, 33—lens, 40—housing.

The invention claimed is:
1. A collimation evaluation device comprising:
a first reflection member having a first reflection surface for reflecting a part of incident light and a second reflection surface for reflecting light transmitted through the first reflection surface of the first reflection member;
a second reflection member having a first reflection surface for reflecting a part of light emitted from the first reflection member and a second reflection surface for reflecting light transmitted through the first reflection surface of the second reflection member; and
a screen from which collimation of the incident light is evaluated on the basis of a direction of interference fringes formed by light reflected on the first reflection surface of the first reflection member and the second reflection surface of the second reflection member and light reflected on the second reflection surface of the first reflection member and the first reflection surface of the second reflection member,
wherein the incident light of a collimation evaluation object is transmitted through the second reflection member and then is incident on the first reflection member.

2. The collimation evaluation device according to claim 1,
wherein one or both of i) the first reflection surface of the first reflection member and the second reflection surface of the first reflection member are non-parallel to each other and ii) the first reflection surface of the second reflection member and the second reflection surface of the second reflection member are non-parallel to each other, and
wherein the direction of interference fringes is caused by non-parallelism of the one or both of i) the first reflection surface of the first reflection member and the second reflection surface of the first reflection member and ii) the first reflection surface of the second reflection member and the second reflection surface of the second reflection member and the direction of interference fringes caused by non-parallelism of the incident light are different from each other.

3. The collimation evaluation device according to claim 1, wherein one or both of i) the first reflection member includes a single flat plate having two surfaces opposite to each other as the first reflection surface of the first reflection member and the second reflection surface of the first reflection member and ii) the second reflection member includes a single flat plate having two surfaces opposite to each other as the first reflection surface of the second reflection member and the second reflection surface of the second reflection member.

4. The collimation evaluation device according to claim 1, wherein one or both of i) the first reflection member includes a first flat plate having the first reflection surface of the first reflection member and a separate second flat plate having the second reflection surface of the first reflection member, the first flat plate is disposed in parallel to the separate second flat, and one or both of the first flat plate and the separate second flat plate move in a direction of where light of a collimation evaluation object is incident into the collimation evaluation device and ii) the second reflection member includes a first flat plate having the first reflection surface of the second reflection member and a separate second flat plate having the second reflection surface of the second reflection member, the first flat plate of the second reflection member is disposed in parallel to the separate second flat plate of the second reflection member.

5. The collimation evaluation device according to claim 4, wherein one or both of i) a distance between the first flat plate of the first reflection member and the separate second flat plate of the first reflection member is variable and ii) a distance between the first flat plate of the second reflection member and the separate second flat plate of the second reflection member is variable.

6. The collimation evaluation device according to claim 1, wherein i) the first reflection surface of the first reflection member and the second reflection surface of the first reflection member and ii) the first reflection surface of the second reflection member and the second reflection surface of the second reflection member are non-parallel to each other, and
wherein one or both of i) the first reflection member is rotatable about an axis substantially perpendicular to the first reflection surface of the first reflection member or the second reflection surface of the first reflection member, and ii) the second reflection member is rotatable about an axis substantially perpendicular to the first reflection surface of the second reflection member or the second reflection surface of the second reflection member.

7. A collimation evaluation method comprising:
using a first reflection member having a first reflection surface for reflecting a part of incident light and a second reflection surface for reflecting light transmitted through the first reflection surface of the first reflection member, and a second reflection member having a first reflection surface for reflecting a part of light emitted from the first reflection member and a second reflection surface for reflecting light transmitted through the first reflection surface of the second flection member;
observing interference fringes formed by i) light reflected on the first reflection surface of the first reflection member and the second reflection surface of the second reflection member and ii) light reflected on the second reflection surface of the first reflection member and the first reflection surface of the second reflection member; and
evaluating collimation of the incident light on the basis of a direction of the observed interference fringes,
wherein the incident light of a collimation evaluation object is transmitted through the second reflection member and then is incident on the first reflection member.

8. The collimation evaluation method according to claim 7,
wherein one or both of i) the first reflection surface of the first reflection member and the second reflection surface of the first reflection member are non-parallel to each other and ii) the first reflection surface of the second reflection member and the second reflection surface of the second reflection member are non-parallel to each other, and
wherein the first reflection member and the second reflection member are disposed such that the direction of observed interference fringes is caused by non-parallelism of the one or both of i) the first reflection surface of the first reflection member and the second reflection surface of the first reflection member and ii) the first reflection surface of the second reflection member and the second reflection surface of the second reflection member and the direction of observed interference fringes caused by non-parallelism of the incident light are different from each other.

9. The collimation evaluation method according to claim 7, wherein one or both of i) the first reflection member includes a single flat plate having two surfaces opposite to each other as the first reflection surface of the first reflection member and the second reflection surface of the first reflection member and ii) the second reflection member includes a single flat plate having two surfaces opposite to each other as the first reflection surface of the second reflection member and the second reflection surface of the second reflection member.

10. The collimation evaluation method according to claim 7, wherein one or both of i) the first reflection member includes a first flat plate having the first reflection surface of the first reflection member and a separate second flat plate having the second reflection surface of the first reflection member, the first flat plate is disposed in parallel to the separate second flat, and one or both of the first flat plate and the separate second flat plate move in a direction of where light of a collimation evaluation object is incident into the collimation evaluation device and ii) the second reflection member includes a first flat plate having the first reflection surface of the second reflection member and a separate second flat plate having the second reflection surface of the second reflection member, the first flat plate of the second reflection member is disposed in parallel to the separate second flat plate of the second reflection member.

11. The collimation evaluation method according to claim 10, wherein one or both of i) a distance between the first flat plate of the first reflection member and the separate second flat plate of the first reflection member is variable and ii) a distance between the first flat plate of the second reflection member and the separate second flat plate of the second reflection member is variable.

12. The collimation evaluation method according to claim 7,
- wherein i) the first reflection surface of the first reflection member and the second reflection surface of the first reflection member and ii) the first reflection surface of the second reflection member and the second reflection surface of the second reflection member are non-parallel to each other, and
- wherein one or both of i) the first reflection member is rotatable about an axis substantially perpendicular to the first reflection surface of the first reflection member or the second reflection surface of the first reflection member, and ii) the second reflection member is rotatable about an axis substantially perpendicular to the first reflection surface of the second reflection member or the second reflection surface of the second reflection member.

* * * * *